Aug. 1, 1961     H. W. ECKER     2,994,391

ELECTROMAGNETIC BALANCE

Filed March 14, 1955     2 Sheets-Sheet 1

HOWARD W. ECKER INVENTOR

*Caswell & Lagaard* ATTORNEYS

Aug. 1, 1961 H. W. ECKER 2,994,391
ELECTROMAGNETIC BALANCE
Filed March 14, 1955 2 Sheets-Sheet 2
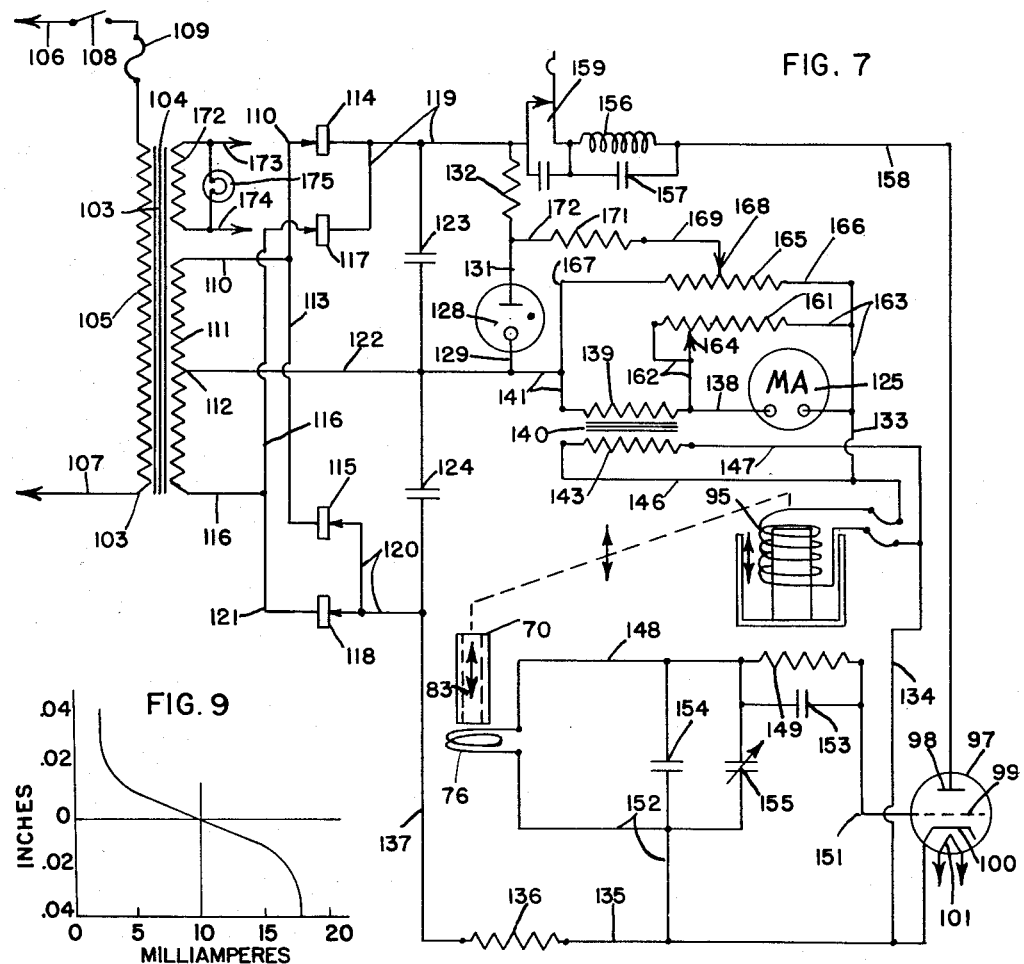
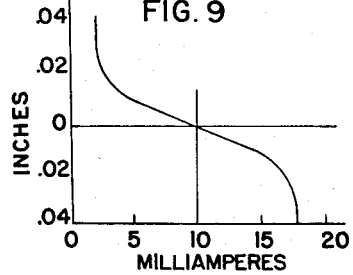
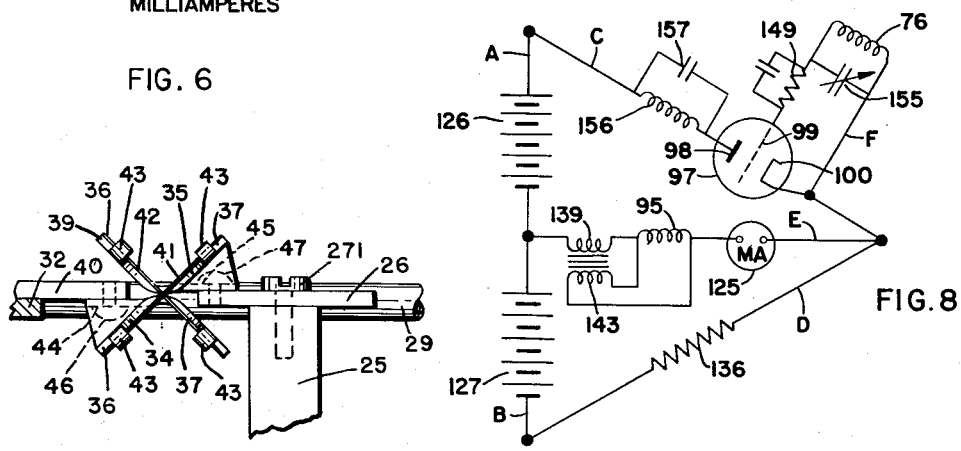
HOWARD W. ECKER INVENTOR
Caswell & Lagaard ATTORNEYS United States Patent Office 2,994,391
Patented Aug. 1, 1961

2,994,391
ELECTROMAGNETIC BALANCE
Howard W. Ecker, 702 W. Wheelock Parkway,
St. Paul, Minn.
Filed Mar. 14, 1955, Ser. No. 493,966
9 Claims. (Cl. 177—210)

The herein disclosed invention relates to electric balances and particularly to a direct reading balance in which the weight of relatively small quantities may be ascertained and by means of which the weight may be directly read from a scale instead of by comparison with standard weights or the movement of a poise.

An object of the invention resides in providing a balance utilizing a beam pivoted intermediate its ends and provided with a pan for the reception of the matter to be weighed carried at one end and with a magnetic counterbalancing device associated with said beam at its other end.

An object of the invention resides in providing an electric actuating device operated by movement of the beam and serving to vary the force produced by said counterbalancing device in accordance with the weight of the matter disposed on the pan.

A still further object of the invention resides in constructing the counterbalance device with a core having an air gap and in disposing within said air gap a coil adapted upon variation in the current flowing therethrough to vary the counterbalancing force, said core and coil being mounted for relative movement, one thereof being fixed and the other moving with the beam.

An object of the invention resides in constructing the actuating device with a core and a coil disposed for relative movement therebetween, one thereof being fixed and the other movable with said beam.

Another object of the invention resides in utilizing an amplifier having an electronic tube provided with a plate, a grid, and a cathode and in connecting the coil of said actuating device in the grid cathode circuit of the tube and the coil of the counterbalancing device in the plate cathode circuit of the tube.

A still further object of the invention resides in providing a beam having pivot means in the form of crossed wires connected to angle shaped mounting members.

Other objects of the invention reside in the novel combination and arrangement of parts and in the details of construction hereinafter illustrated and/or described.

In the drawings:

FIG. 6 is a fragmentary sectional view taken on line 6—6 of FIG. 1 and drawn to a greater scale.

FIG. 7 is a wiring diagram of the circuit of the invention.

FIG. 8 shows a simplified wiring diagram of the circuit. FIG. 9 is a chart illustrating the operation of the oscillator.

Figure 1:
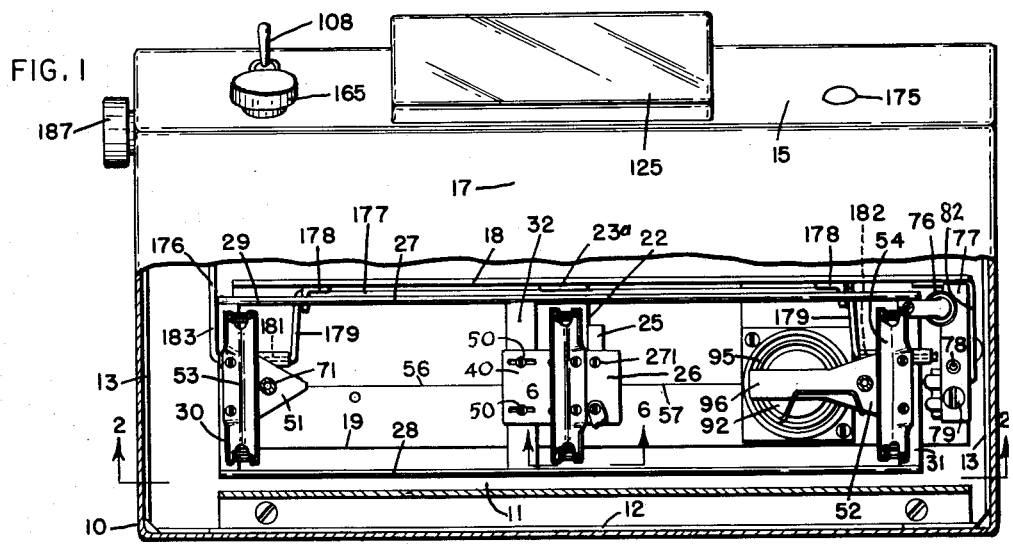
FIG. 1 is a plan view of a balance illustrating an embodiment of the invention and with portions broken away to show the construction of the same.
Figure 2:
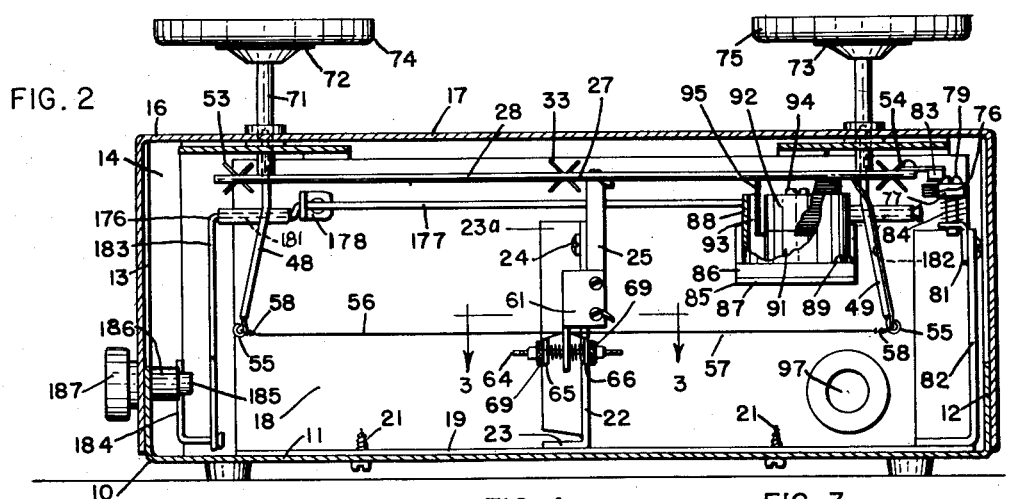
FIG. 2 is an elevational sectional view taken on line 2—2 of FIG. 1.

The invention utilizes a balance best shown in FIGS. 1 and 2. This balance is mounted in a case 10 having a bottom 11 with flanges 12 turned up from the front and back of the bottom, and flanges 13 turned up from the sides of the bottom. The flanges 13 have in turn flanges 14 turned inwardly from the forward portions of the same and to which is attached a panel 15 supporting the electrical components of the invention. A cover 16 is secured to the flanges 12 and 13 and has a top 17 through which portions of the balance extend.

The balance proper is mounted on a vertical plate 18 which extends upwardly from the bottom 11 and which is attached thereto through a flange 19 secured to said bottom by means of screws 21. Extending rearwardly from the plate 18 is a bracket 22 which has flanges 23 and 23a of which the flange 23a is secured to said plate by spot welding or otherwise. This bracket has secured to it by means of screws 24 a block 25 of insulating material. This block has attached to it a supporting member 26 which is held in position thereon by means of screws 271.

Figures 3, 4, 5:
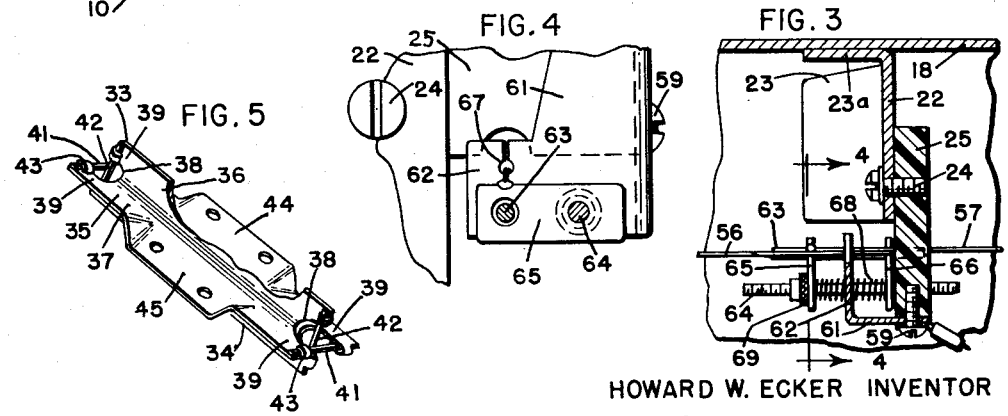
FIG. 3 is a fragmentary plan sectional view taken on line 3—3 of FIG. 2 and drawn to a greater scale.
FIG. 4 is an elevational sectional view taken on line 4—4 of FIG. 3.
FIG. 5 is a perspective view of one of the pivot means of the invention and detached from the balance.

The upper beam 29 of the balance consists of two rods 27 and 28 which have brazed to the ends of the same cross bars 30 and 31 and a cross bar 32 intermediate the ends of the same. The beam 29 is pivoted to the supporting member 26 by means of pivot means indicated in its entirety by the reference numeral 33 and illustrated in detail in FIGS. 5 and 6. This pivot means comprises two angle shaped mounting members 34 and 35. These members each have a flange 36 and a flange 37 and the vertexes of said flanges are arranged in close proximity to one another as shown in FIG. 6. The ends of the flanges 36 and 37 are cut away as designated at 38 in FIG. 5 to leave lugs 39 on said flanges projecting outwardly therefrom. With the parts properly arranged, the flange 36 of the mounting member 34 lies substantially in the plane of the flange 37 of the mounting member 35 and the flange 37 of the first mounting member 34 lies in the plane of the flange 36 of the mounting member 35. Extending across the corresponding lugs 39 of the respective mounting members are wire pieces 41 and 42 which are soldered to said lugs. These wire pieces cross each other as shown in FIGS. 5 and 6 and form pivot members acting between said mounting members. To limit the extent of the bending of the wire pieces 41, clips 43 are provided, which are formed at the inner edges of the lugs 39. The flange 36 of the mounting member 34 has an offset portion 44 while the flange 37 of the member 35 has an offset portion 45. These offset portions lie in substantially parallel planes when the pivot means is in normal position. The offset portion 44 of mounting member 34 is attached to a plate 40 by means of screws 46. This plate is in turn attached to the cross bar 32 by means of screws 50. The offset portion 45 of the mounting member 35 is similarly attached to the supporting member 26 by means of screws 47. The cross bar 32 is so positioned that the intersections of the wire pieces 41 and 42 of the pivot means 33 fall exactly midway between the ends of the beam 29. By means of this construction, the beam is pivoted at its center about the pivot means 33 as a fulcrum and being carried by the supporting member 26 is insulated from the case 10 and the other structure attached thereto.

At the ends of the beam 29 are provided legs 48 and 49 which are attached to plates 51 and 52. These plates are hingedly connected to the ends of the beam 29 by pivot means 53 and 54. These pivot means are identical with the pivot means 33 and are attached to the cross bars 30 and 31 and to the plates 51 and 52 in identically the same manner as the pivot means 33 is attached to the cross bar 32 and to the supporting member 26. The lower ends of the legs 48 and 49 are formed with hooks 55 which are connected to wire links 56 and 57. These links have loops 58 formed on the ends of the same and which hook over the hooks 55. The intermediate ends of these links are attached to the block 25 of insulating material by means of a construction shown in detail in FIGS. 3 and 4. Secured to the edge of the block 25 by means of screws 59 is a bracket 61 which has an arm 62 extending toward the plate 18. This arm carries two rods 63 and 64 of which the rod 64 is threaded at its ends. Mounted on these rods are two sliders 65 and 66. The link 56 is attached to the slider 66 while the link 57 is attached to the slider 65. These links pass through an aperture 67 in the arm 62 of the bracket 61 and by means thereof are held in axial alignment. Springs 68 mounted between the arms 62 and the sliders 65 and 66 urge the sliders outwardly. Adjusting screws 69 screwed on the threaded ends of the rod 64 serve to hold the sliders 65 and 66 in properly adjusted position on the two rods 63 and 64. By means of this construction, the lengths of the links 56 and 57 and the positions of the ends of the same may be adjusted.

The legs 48 and 49 project upwardly above the plates 51 and 52. Mounted on such portions of the legs are tubular stems 71 which have attached to them holders 72 and 73 on which suitable pans 74 and 75 may be placed. These pans serve the usual purpose. By disposing the pans 74 and 75 inwardly from the pivot means 53 and 54, any weight placed on said pans together with the weight of the pans produces a moment tending to tension the links 56 and 57.

The actuating means for actuating the balance consists of a coil 76, shown in FIGS. 1 and 2, which is cemented to an insulating bar 77. This bar is slidably mounted on a rod 78. A screw 79 extends through this bar and serves to move the same downwardly. A spring 84 encircles the screw 79 and urges the bar 77 upwardly and against the head of said screw. This screw is threaded into a mounting 81 attached to a bracket 82, similar to the bracket 22, and which in turn is secured to the plate 18. The cross bar 31 has secured to it a core 83 of ferrous material which is adapted to enter into the coil 76.

Operating in conjunction with the beam 29 is a magnetic counterbalancing device indicated by the reference numeral 85. This device consists of a heavy metal plate 86 which is mounted on a bracket 87 attached to the plate 18. The plate 86 has issuing upwardly from it a sleeve 88 of ferrous material. The plate 86 is secured to the bracket 87 by means of screws 89. Within the interior of the sleeve 88 is a permanent magnet 91 which is circular in form and which is spaced from the sleeve 88. Overlying this magnet is a slug of iron 92 which is of the same size and shape as the magnet 91. These two structures form an air gap 93 within the sleeve 88 which is open at the top. A screw 94 extends through the slug 92 and the magnet 91 and is screwed in the plate 86. This screw holds the parts in assembled relation. Operated within the air gap 93 is a coil 95 which is attached to an arm 96 extending outwardly from the plate 52. This coil may be wound on a non-ferrous coil form, not shown in detail, which may be soldered to the arm 96 or the same may be secured thereto in any suitable manner. As the beam 29 moves, coil 95 travels in the air gap 93 cutting the lines of force passing between the slug 92 and the sleeve 88.

In order to hold the beam 29 of the balance from movement when the balance is not in use, a locking device 176 is employed. This device utilizes a shaft 177 journaled in bearings 178 secured to the plate 18. Arms 179 extend outwardly therefrom and have cushioned fingers 181 and 182 at the ends of said arms engageable with the pivot means 53 and 54. The finger 181 has issuing from it a depending arm 183. This arm is engaged by another arm 184 fast on a shaft 185. Shaft 185 is journaled in a bearing 186 attached to the flange 13 of case 10. This shaft projects through said flange and the cover 16 and has attached to its outer end a knob 187 by means of which said shaft may be rotated and the fingers 181 and 182 brought into operative position.

The electrical circuit of the invention is shown in FIGS. 7 and 8 and utilizes a thermionic tube 97. This tube may be a triode as illustrated and has a plate 98 serving as an output element, a grid 99 serving as an input element, and a cathode 100. The said cathode is heated by means of a heater 101. The tube 97 is energized from power supply means indicated in its entirety by the reference numeral 103. This power supply means includes a transformer 104 having a primary 105 connected to a suitable source of alternating current by means of conductors 106 and 107. The conductor 106 has connected in it a switch 108 and a fuse 109. The transformer 104 has a high voltage secondary winding 111 which is provided with a center tap 112. One end of the winding 111 is connected by means of conductors 110 and 113 to two rectifiers 114 and 115. The other end of this winding is connected by conductors 116 and 121 to two rectifiers 117 and 118. This in effect produces two power supplies, one controlled by the rectifiers 114 and 117 and the other by the rectifiers 115 and 118. The rectifiers 114 and 117 are connected together by means of a conductor 119 while the rectifiers 115 and 118 are connected together by means of a conductor 120. The center tap 112 has connected to it a conductor 122. Two filter condensers 123 and 124 are connected between the conductors 119 and 122 and the conductors 122 and 120. The rectifiers 114 and 117 provide a power supply indicated by the reference numeral 126 while the rectifiers 115 and 118 provide a power supply indicated by the reference numeral 127. The voltage of power supply 126 is maintained substantially constant by means of a voltage regulator tube 128. This tube is connected by means of a conductor 129 to the conductor 122. Another conductor 131 connects the said tube to a suitable dropping resistor 132 which in turn is connected to the conductor 119.

The invention utilizes a milliammeter 125 which is mounted on the panel 15. One side of this milliammeter is connected by means of a conductor 133 to one end of the coil 95. The other end of this coil is connected by means of a conductor 134 to the cathode 100 of tube 97 which serves as a tuned grid, tuned plate oscillator amplifier. The cathode 100 is further connected by means of a conductor 135 to a cathode resistor 136 which in turn is connected by means of a conductor 137 to the conductor 120 of power supply 127. The other side of the milliammeter 125 is connected by means of a conductor 138 to one end of the primary 139 of a damping transformer 140. The other end of the primary 139 is connected by means of a conductor 141 to the conductor 122 of the power supplies 126 and 127. The secondary 143 of the transformer 140 is connected by means of conductors 146 and 147 to the conductors 133 and 134.

The range or full scale reading of the meter 125 may be regulated by means of a potentiometer 161, the ends of which are connected by conductors 162 and 163 to the conductors 138 and 133 leading from said meter. The movable contact 164 of the potentiometer 161 is directly connected to the lead 162 and serves to short out a portion of the resistance of said potentiometer as the same is moved from one end of its range of movement to the other. Zero adjustment of the milliammeter 125 is procured by means of another potentiometer 165, which has one end connected by means of a conductor 166 to the conductor 163. The other end of this potentiometer is connected by means of a conductor 167 to the conductor 141 and through it to the conductor 122 of the power supplies 126 and 127. The adjustable contact 168 of this potentiometer is connected by means of a conductor 169 to a fixed resistor 171. This resistor is connected by means of a conductor 172 to the conductor 131 previously referred to and from which a regulated voltage may be procured.

The grid circuit for the grid 99 of the tube 97 includes the coil 76 of the actuating device 70, one end of which is connected by means of a conductor 148 to a grid leak resistor 149. This grid leak resistor is in turn connected by means of a conductor 151 to the grid 99. The other end of the coil 76 is connected by means of a conductor 152 to the conductor 135 which is connected to the cathode 100. A grid leak by-pass condenser 153 is employed which is connected across the grid leak 149. The circuit through the coil 76 is tuned by means of a fixed condenser 154 and an adjustable condenser 155 which are connected in parallel across the conductors 148 and 152 leading from said coil. The coil 76, and condensers 154 and 155 provide a tunable resonant circuit for the grid 99 of tube 97.

Heater current for energizing the heater 101 of the tube 97 is procured from a secondary winding 172 on the transformer 104. Conductors 173 and 174 are connected to this secondary winding and to the heater 101. A pilot lamp 175 is also connected across this winding and serves to indicate when the apparatus is in operation.

The plate circuit of the tube 97 is a tuning device comprising a tuned resonant circuit which utilizes an inductance 156 which is shunted by a condenser 157. The inductance 156 and condenser 157 are connected at one end by a conductor 158 to the plate 98 of tube 97. The other ends of this inductance and condenser are connected through a jack 159 and to the conductor 119 of the power supply 126.

FIGURE 8 shows a simplified wiring diagram which is believed will help illustrate the invention. In this diagram it will be noted that six circuits A, B, C, D, E, and F are employed which are connected in the following manner:

In the circuits A and B the two sources of direct current which have been illustrated as batteries for the sake of convenience, are connected with the positive side of one battery connected to the negative side of the other battery. The circuit C constitutes the plate circuit of the tube 97 which includes the tuning device 157. This circuit is connected to the positive side of the battery of the circuit A. The circuit D is the cathode circuit of the tube which includes the cathode resistor 136 and is connected to the negative side of the battery of the circuit B and the cathode. Between the cathode and the juncture of the circuits A and B is connected the counterbalancing circuit E which includes meter 125 counterbalancing coil 95 and the primary 139 of transformer 140. The sixth circuit F is the grid circuit of the tube which includes the sensing coil 76, condenser 155, and the grid-leak resistor 149.

The operation is as follows: In a tuned plate, tuned grid radio frequency oscillator circuit having a grid leak, a minimum flow of current occurs when the circuit is tuned to resonance. If the circuit is slightly tuned off resonance, the current immediately rises rapidly. The curve shown in FIG. 9 illustrates the phenomenon. While the frequency varies somewhat the effect is small compared to the change in current. With the parts in normal position and with no load on the pan, the voltage across the circuits A through C and B through D are equal and opposite and cancel out each other. No current then flows in the counterbalancing circuit E. Upon movement of the beam, by placing a load on the pan, the inductance in coil 76 is varied and the inductance of the grid circuit is varied which detunes the oscillator. This immediately causes relatively high flow of current in the plate circuit C and disturbs the balances of the two combination circuits previously designated. Current now flows through the meter 125 and coil 95 and said coil immediately reacts to counterbalance the load on the beam and the meter pointer comes to rest at a position proportional to the load on the pan. It will be noted from the curve in FIGURE 9 that the central portion of the curve is a relatively straight inclined line so that the current passing through the counterbalancing coil is directly proportional to the movement of the beam. It is this portion of the curve that is used in the operation of the instrument and permits of using an ordinary D'Arsonval meter.

The milliammeter 125 is connected in series with the coil 95 and hence indicates the current passing through the same. Milliammeter 125 is graduated to read in units of weight and will directly indicate on its scale the weight of the matter being weighed. In one balance constructed by applicant, the scale was graduated to read from zero to 10 grains. Other standards of weight may of course be employed and the balance adjusted accordingly. The transformer 140 serves as a damping device and prevents hunting. This transformer is a current transformer in which the primary is connected in series with the meter and the counterbalancing coil of the invention and the secondary across said coil. When the beam is at rest with no load on the pan, no current flows through the circuit and the milliammeter and no voltage is generated in the transformer. When, however, the load is placed on the pan, coil 76 causes current to flow through the counterbalancing coil 91. As this current rises from 0 upwardly, momentary flow of current occurs through the primary 139 of the transformer. This sets up a current in the secondary, which is connected across the counterbalancing coil 95 and slows down the movement of the same. As soon as the counterbalancing coil stops, no current will be generated in the secondary as the current flowing in the circuit is direct and not varying. The transformer hence does not affect the reading of the meter but merely acts when the current in the primary is varying due to movement of the beam.

The advantages of the invention are manifest. The balance is a direct reading and weights of small delicate objects may be quickly and accurately determined. With the invention, the chances of error are exceedingly small. The apparatus can be quickly adjusted for zero and full scale reading of the meter so that the balance will be accurate regardless of the voltage applied to the power supply. By means of the particular hinge construction employed and the design of the balance, the balance can be constructed at a nominal expense and will have an extremely small amount of friction so that very light objects can be weighed.

Changes in the specific form of the invention, as herein described, may be made within the scope of what is claimed without departing from the spirit of the invention.

Having described the invention, what is claimed as new and desired to be protected by Letters Patent is:

1. In an electric balance and a pivoted beam, a pan for the reception of the matter to be weighed connected to said beam, a magnetic counterbalancing device associated with said beam and having a core provided with an air gap, a coil disposed in said air gap, said coil and core being relatively movable, one thereof being fixed and the other being movable with said beam, said counterbalancing device exerting a counterbalancing force on said beam, an actuating device comprising a core having an air gap and a coil in said air gap, one thereof being fixed and the other movable with said beam, the combination of power supply means including a transformer having two secondary windings connected in series with a common conductor therebetween, rectifiers connected to said windings and having output conductors connected thereto, one rectifier producing positive voltage and the other negative voltage at said output conductors with reference to the common conductor, an electronic tube operating as an oscillator having a grid, a plate and a cathode, a resonant grid circuit connected to said grid and cathode and including the coil of said actuating device, a condenser in parallel therewith and forming therewith a tuning device and a grid resistor, a resonant plate circuit connected to the plate of said tube and to the output conductor of the rectifier supplying positive voltage and including an inductance and a condenser in parallel, a cathode circuit connected to said common conductor and to said cathode and including the counterbalancing coil and a meter and another cathode circuit connected to the output conductor of the rectifier supplying negative voltage and including a cathode resistor.

2. In an electric balance and a pivoted beam, a pan for the reception of the matter to be weighed connected to said beam, a magnetic counterbalancing device associated with said beam and having a core provided with an air gap, a coil disposed in said air gap, said coil and core being relatively movable, one thereof being fixed and the other being movable with said beam, said counterbalancing device exerting a counterbalancing force on said beam, an actuating device comprising a core having an air gap and a coil in said air gap, one thereof being fixed and the other movable with said beam, the combination of power supply means including a transformer having two secondary windings connected in series with a common conductor therebetween, rectifiers connected to said windings and having output conductors connected thereto, one rectifier producing positive voltage and the other negative voltage at said output conductors with reference to the common conductor, an electronic tube operating as an oscillator having a grid, a plate and a cathode, a resonant grid circuit connected to said grid and cathode and including the coil of said actuating device, a condenser in parallel therewith and forming therewith a tuning device and a grid resistor, a resonant plate circuit connected to the plate of said tube and to the output conductor of the rectifier supplying positive voltage and including an inductance and a condenser in parallel, a cathode circuit connected to said common conductor and including the counterbalancing coil and a meter and another cathode circuit connected to the output conductor of the rectifier supplying negative voltage and including a cathode resistor, a second transformer having primary winding and secondary winding, the primary winding being connected in said common conductor and the secondary winding being connected across the coil of said counterbalancing device.

3. In an electric balance and a pivoted beam, a pan for the reception of the matter to be weighed connected to said beam, a magnetic counterbalancing device associated with said beam and having a core provided with an air gap, a coil disposed in said air gap, said coil and core being relatively movable, one thereof being fixed and the other being movable with said beam, said counterbalancing device exerting a counterbalancing force on said beam, an actuating device comprising a core having an air gap and a coil in said air gap, one thereof being fixed and the other movable with said beam, the combination of power supply means including a transformer having two secondary windings connected in series with a common conductor therebetween, rectifiers connected to said windings and having output conductors connected thereto, one rectifier producing positive voltage and the other negative voltage at said output conductors with reference to the common conductor, an electronic tube operating as an oscillator having a grid, a plate and a cathode, a resonant grid circuit connected to said grid and cathode and including the coil of said actuating device a condenser parallel therewith and forming therewith a tuning device and a grid resistor, a resonant plate circuit connected to the plate of said tube and to the output conductor of the rectifier supplying positive voltage and including an inductance and a condenser in parallel, a cathode circuit connected to said common conductor and including the counterbalancing coil and a meter and another cathode circuit connected to the output conductor of the rectifier supplying negative voltage and including a cathode resistor, and a variable resistor connected between one of said output conductors and the coil of said counterbalancing device.

4. In an electric balance having a pivoted beam, a pan for the reception of the matter to be weighed connected to said beam, a magnetic counterbalancing device associated with said beam and having a core and a coil, said coil and core being relatively movable, one thereof being fixed and the other being movable with said beam, said counterbalancing device exerting a counterbalancing force on said beam, an actuating device comprising a core and a coil, said core and coil being relatively movable, one thereof being fixed and the other thereof movable with said beam, the combination of first and second power circuits connected in series and having sources of direct current therein wth the negative side of the source in the first circuit connected to the positive side of the source in the second circuit at the juncture of said circuits, an electronic tube operating as an oscillator having a grid, a resonant plate and a cathode, a plate circuit connected to the first power circuit and to the positive side of the source therein and to the plate of said tube, an inductance and a condenser in parallel therein, a cathode circuit connected to the second power circuit and to the negative side of the source therein and to the cathode of said tube, a resistor in said cathode circuit, a resonant grid circuit connected to the grid of said tube and to the cathode thereof, the coil of said actuating device being connected in said grid circuit, a condenser connected across said coil, a counterbalancing circuit connected to the juncture between said power circuits and to said cathode, the coil of said counterbalancing device being connected in said counterbalancing circuit, and an ammeter in said counterbalancing circuit, said first power circuit and said plate circuit being balanced against said second power circuit and said cathode circuit to prevent flow of current through said counterbalancing circuit when there is no matter on said pan.

5. In an electric balance having a pivoted beam, a pan for the reception of the matter to be weighed connected to said beam, a magnetic counterbalancing device associated with said beam and having a core and a coil, said coil and core being relatively movable, one thereof being fixed and the other being movable with said beam, said counterbalancing device exerting a counterbalancing force on said beam, an actuating device comprising a core and a coil, said core and coil being relatively movable, one thereof being fixed and the other thereof movable with said beam, the combination of first and second power circuits connected in series and having sources of direct current therein with the negative side of the source in the first circuit connected to the positive side of the source in the second circuit at the juncture of said circuits, an electronic tube operating as an oscillator having a grid, a plate and a cathode, a resonant plate circuit connected to the first power circuit and to the positive side of the source therein and to the plate of said tube, an inductance and a condenser in parallel therein, a cathode circuit connected to the second power circuit and to the negative side of the source therein and to the cathode of said tube, a resistor in said cathode circuit, a resonant grid circuit connected to the grid of said tube and to the cathode thereof, the coil of said actuating device being connected in said grid circuit, a condenser connected across said coil, a counterbalancing circuit connected to the juncture between said power circuits and to said cathode, the coil of said counterbalancing device being connected in said counterbalancing circuit, and an ammeter in said counterbalancing circuit, said first power circuit and said plate circuit being balanced against said second power circuit and said cathode circuit to prevent flow of current through said counterbalancing circuit when there is no matter on said pan, a transformer having a primary and a secondary, said primary being connected in said counterbalancing circuit in series with the coil of said counterbalancing device and said secondary being connected across said coil.

6. In an electric balance having a pivoted beam, a pan for the reception of the matter to be weighed connected to said beam, a magnetic counterbalancing device associated with said beam and having a core and a coil, said coil and core being relatively movable, one thereof being fixed and the other being movable with said beam, said counterbalancing device exerting a counterbalancing force on said beam, an actuating device comprising a core and a coil, said core and coil being relatively movable, one thereof being fixed and the other thereof movable with said beam, the combination of a direct current voltage divider having a positive connection, a negative connection and an intermediate connection, an electronic tube operating as an oscillator having a grid, a plate and a cathode, a resonant plate circuit connected to the positive connection and to the plate of said tube, an inductance and a condenser in parallel therein, a cathode circuit connected to the negative connection and to the cathode of said tube, a resistor in said cathode circuit, a resonant grid circuit connected to the grid of said tube and to the cathode thereof, the coil of said actuating device being connected in said grid circuit, a condenser connected across said coil, a counterbalancing circuit connected to said intermediate connection and to said cathode, the coil of said counterbalancing device being connected in said counterbalancing circuit, and an ammeter in said counterbalancing circuit, said first power circuit and said plate circuit being balanced against said second power circuit and said cathode circuit to prevent flow of current through said counterbalancing circuit when there is no matter on said pan.

7. In an electric balance having a pivoted beam, a pan for the reception of the matter to be weighed connected to said beam, a magnetic counterbalancing device associated with said beam and having a core provided with an air gap, a coil disposed in said air gap, said coil and core being relatively movable, one thereof being fixed and the other being movable with said beam, said counterbalancing device exerting a counterbalancing force on said beam, an actuating device comprising a core having an air gap and a coil in said air gap, one thereof being fixed and the other movable with said beam, the combination of power supply means including two sources of direct current, a common conductor connecting the positive side of one source to the negative side of the other source, an electronic oscillator amplifier having an input element, an output element, and a common element, a resonant input circuit connected to said input element and to said common element and including the coil of said actuating device, and a condenser in parallel therewith, said input circuit including an input leakage resistor, a resonant output circuit connected to said output element and to the output side of the source of direct current providing the proper potential for said electronic oscillator amplifier, and including an inductance and a condenser in parallel, a common element circuit connected to said common conductor of said power supply means and to said common element and including the counterbalancing coil and a meter, and another common element circuit connected to the output conductor of the other source of direct current and including a common element resistor.

8. In an electric balance having a pivoted beam, a pan for the reception of the matter to be weighed connected to said beam, a magnetic counterbalancing device associated with said beam and having a core provided with an air gap, a coil disposed in said air gap, said coil and core being relatively movable, one thereof being fixed and the other being movable with said beam, said counterbalancing device exerting a counterbalancing force on said beam, an actuating device comprising a core having an air gap and a coil in said air gap, one thereof being fixed and the other movable with said beam, the combination of power supply means including two sources of direct current, a common conductor connecting the positive side of one source to the negative side of the other source, an electronic oscillator amplifier having an input element, an output element, and a common element, a resonant input circuit connected to said input element and to said common element and including the coil of said actuating device, and a condenser in parallel therewith, said input circuit including an input leakage resistor, a resonant output circuit connected to said output element and to the output side of the source of direct current providing the proper potential for said electronic oscillator amplifier, and including an inductance and a condenser in parallel, a common element circuit connected to said common conductor of said power supply means and to said common element and including the counterbalancing coil and a meter, another common element circuit connected to the output conductor of the other source of direct current and to said output element and including a common element resistor, and a variable resistor connected between the output side of one of said sources of direct current and the end of the coil of said counterbalancing device producing flow of current through said coil in addition to that produced by said electronic oscillator amplifier.

9. In an electric balance having a pivoted beam, a pan for the reception of the matter to be weighed connected to said beam, a magnetic counterbalancing device associated with said beam and having a core provided with an air gap, a coil disposed in said air gap, said coil and core being relatively movable, one thereof being fixed and the other being movable with said beam, said counterbalancing device exerting a counterbalancing force on said beam, an actuating device comprising a core having an air gap and a coil in said air gap, one thereof being fixed and the other movable with said beam, the combination of power supply means including two sources of direct current, a common conductor connecting the positive side of one source to the negative side of the other source, an electronic oscillator amplifier having an input element, an output element, and a common element, a resonant input circuit connected to said input element and to said common element and including the coil of said actuating device, and a condenser in parallel therewith, said input circuit including an input leakage resistor, a resonant output circuit connected to said output element and to the output side of the source of direct current providing the proper potential for said electronic oscillator amplifier, and including an inductance and a condenser in parallel, a common element circuit connected to said common conductor of said power supply means and to said common element and including the counterbalancing coil and a meter, another common element circuit connected to the output conductor of the other source of direct current and including a common element resistor, a transformer having a primary winding and a secondary winding, the primary winding being connected in said first common element circuit in series with said meter and counterbalancing coil and the secondary shunting the said counterbalancing coil.

References Cited in the file of this patent

UNITED STATES PATENTS

| | | |
|---|---|---|
| Re. 24,267 | Ostermann et al. | Jan. 22, 1957 |
| 1,410,614 | Smith | Mar. 28, 1922 |
| 1,764,649 | Schaper | June 17, 1930 |
| 2,013,937 | Williams | Sept. 10, 1935 |

(Other references on following page)

UNITED STATES PATENTS

| | | |
|---|---|---|
| 2,029,902 | Waltz | Feb. 4, 1936 |
| 2,117,894 | Lenehan | May 17, 1938 |
| 2,351,606 | Gold et al. | June 20, 1944 |
| 2,360,751 | Ziebolz | Oct. 17, 1944 |
| 2,371,040 | Fisher et al. | Mar. 6, 1945 |
| 2,381,268 | Eastman | Aug. 7, 1945 |
| 2,545,908 | Weckerly | Mar. 20, 1951 |
| 2,559,919 | Gustafsson | July 10, 1951 |
| 2,564,221 | Hornfeck | Aug. 14, 1951 |
| 2,602,660 | Shannon | July 8, 1952 |
| 2,611,659 | Hadley | Sept. 23, 1952 |
| 2,623,741 | Borekhuysen | Dec. 30, 1952 |
| 2,631,027 | Payne | Mar. 10, 1953 |
| 2,638,780 | Holford | May 19, 1953 |
| 2,662,223 | Brewer | Dec. 8, 1953 |
| 2,674,502 | Faxen | Apr. 6, 1954 |
| 2,675,222 | Clark | Apr. 13, 1954 |
| 2,766,981 | Lauler et al. | Oct. 16, 1956 |

FOREIGN PATENTS

| | | |
|---|---|---|
| 956,911 | France | Aug. 15, 1949 |
| 984,083 | France | Feb. 21, 1951 |
| 1,044,426 | France | June 17, 1953 |

UNITED STATES PATENT OFFICE
CERTIFICATE OF CORRECTION

Patent No. 2,994,391  August 1, 1961

Howard W. Ecker

It is hereby certified that error appears in the above numbered patent requiring correction and that the said Letters Patent should read as corrected below.

Column 8, line 28, strike out "resonate", and insert the same before "plate", second occurrence, same line 28.

Signed and sealed this 27th day of February 1962.

(SEAL)
Attest:

ERNEST W. SWIDER
Attesting Officer

DAVID L. LADD
Commissioner of Patents